United States Patent [19]

Godfrey

[11] 4,088,728
[45] May 9, 1978

[54] METHOD FOR IMPARTING GAUGE VARIATIONS TO IMPROVE ROLL FORMATION IN REGENERATED CELLULOSE FILM

[75] Inventor: John N. Godfrey, Asheville, N.C.

[73] Assignee: Olin Corporation, Pisgah Forest, N.C.

[21] Appl. No.: 774,857

[22] Filed: Mar. 7, 1977

[51] Int. Cl.$^2$ .................. B29D 7/26; B29D 7/02; B29D 7/20; B29C 25/00
[52] U.S. Cl. .................. 264/167; 264/188; 264/343
[58] Field of Search .............. 264/188, 199, 200, 216, 264/217, 218, 214, 195, 167, 207, 232, 340, 343

[56] References Cited

U.S. PATENT DOCUMENTS

| 2,036,377 | 4/1936 | Wells | 264/217 |
| 2,770,015 | 11/1956 | Rosser et al. | 264/344 |
| 2,921,345 | 1/1960 | Bennes | 264/218 |
| 3,056,164 | 10/1962 | Reichel et al. | 264/232 |
| 3,515,780 | 6/1970 | O'Connell et al. | 264/188 |

FOREIGN PATENT DOCUMENTS 1,369,155   9/1963   France .................. 264/177

Primary Examiner—James B. Lowe
Attorney, Agent, or Firm—Robert W. Habel

[57] ABSTRACT

Improved roll formation in regenerated cellulose film is obtained by a method for introducing randomized gauge variations in the film on the casting machine by varying the water content in the gel film in scattered areas across the film prior to drying. Those areas of the film containing more moisture before drying tend to be thicker than those areas containing less moisture resulting in gauge variations throughout the film. Since the gauge variations are randomly imparted to the film across its width, they do not pile up on top of one another to form gauge bands when the film is wound into rolls and the effect on roll formation of any gauge bands inherently present in the film from the casting operation are minimized due to the (superimposed) randomly imparted gauge variations. Preferably, the method comprises imparting the random gauge variations in the film by producing diagonal tracks of water on the film with a transversely moving squeegee band containing a plurality of slight indentations. The squeegee is positioned between the last bath on the casting machine and the dryer and moves transversely across the film. Any one indentation in its surface contacting the film leaves a small track of water extending diagonally across the film resulting in more moisture in that area of the film before drying and an increased thickness in that area after the film is dried.

6 Claims, 4 Drawing Figures

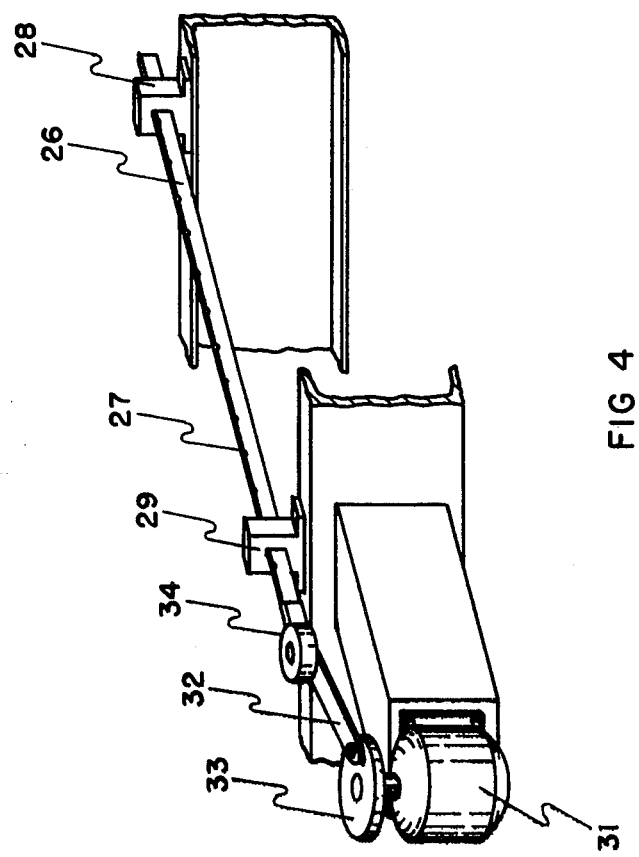
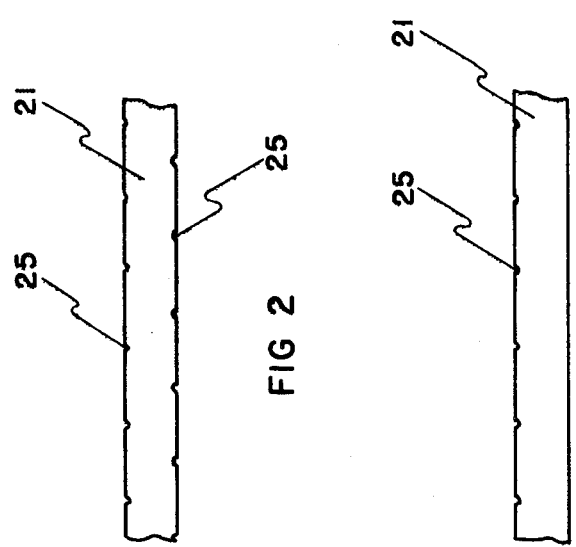

METHOD FOR IMPARTING GAUGE VARIATIONS TO IMPROVE ROLL FORMATION IN REGENERATED CELLULOSE FILM

BACKGROUND OF THE INVENTION

1. Field of the Invention

This invention relates generally to the production of regenerated cellulose film and more particularly to a method for treating regenerated cellulose film during the production thereof that enables improved roll formation in the finished product.

2. Prior Art

In the manufacture of regenerated cellulose film, a viscose solution is extruded through a die into an acid coagulating and regenerating bath where the film is cast and then subsequently passed in a serpentine path through additional baths for desulfuring, washing, bleaching, and softening. Thence it is passed through a drying apparatus and wound up into rolls. The details of such process are well known in the prior art and are generally disclosed in U.S. Pat. No. 1,548,864.

One of the problems associated with regenerated cellulose film that has plagued producers from the beginning is the occurrence of thick or raised areas in the film, called gauge variations, running parallel along the length of the film. Individually, such gauge variations are insignificant. However, when the film is wound into rolls, the raised areas pile on top of one another forming gauge bands causing uneven stretching of the film in the vicinity of the bands and concomitant downgrading or loss of value of the finished product. Normally, such gauge variations are caused by slight variations in the die lips which produce large variations in the film as it is extruded. Attempts at correcting the imperfections in the die lips have generally proved unsuccessful or too costly. Other methods of minimizing the problem have also been tried such as scattering the gauge variations using a rotating tubular die as disclosed in U.S. Pat No. 3,280,234. While this method can be used in the production of tubular films, it is not feasible for the extrusion of flat films through the straight parallel lips of an elongated die. Also, U.S. Pat. No. 2,941,255 discloses a method of minimizing the effects of gauge variations in regenerated cellulose film by continuously reciprocating the gel film transversely to the direction of travel during the wet processing stage but prior to application of the softener. This has the effect of scattering some of the imperfections in the film across its width rather than have them pile up over a narrow area. While this technique is effective, it leaves much to be desired where severe gauge variations are encountered, particularly those caused by imperfections in the die lips.

SUMMARY OF THE INVENTION

Surprisingly, we have found that the roll formation of regenerated cellulose film can be markedly improved so as to minimize the effects of gauge bands and other defects that normally occur in the film, by intentionally imparting random gauge variations in the film during its manufacture. The basic principle of the invention is to produce randomized gauge variations in the cellulose film while it is in the gel state after it leaves the last bath on the casting machine, usually the softener bath, and before it enters the dryer following the casting, desulfuring, washing, bleaching, and softening stages.

As used herein, randomized gauge variations means variations in film thickness which are not constant in lanes extending parallel to the machine direction for extended lengths of film. Thickness variations which normally occur in machine direction lanes reinforce themselves, are amplified in the windup, and are a specific cause of many roll formation defects.

In accordance with this invention, randomized gauge variations in regenerated cellulose film are intentionally produced by a method characterized by varying the water content of the gel film in diagonal patterns across the width of the sheet immediately prior to drying in the casting machine dryer. Those areas containing more moisture cause the thickness of the film to be increased due to either the extra water at that location in the final dried sheet or because the cellulose swollen with the extra moisture does not collapse as much as that at an adjacent location not containing the extra moisture. In any case, the randomized gauge variations substantially improve roll formation as the film is wound and minimize the effects of any gauge bands inherently in the film resulting from the die casting operation.

Preferably, the water content of the film is varied by a continuously moving squeegee having a plurality of spaced indentations in its surface that contacts the film as it leaves the final bath prior to entering the dryer. The squeegee, which is driven to move transversely across the film, is normally used to wipe off excess water on the film from the final bath, usually an aqueous softener solution. The indentations allow small amounts of water to pass the squeegee, thus increasing the thickness of the film at those locations. Since the squeegee and cast sheet of film are both continuously moving, a given indentation in the squeegee will leave a diagonal track of water on the film. If the squeegee is an endless band continuously moving in one direction on one side of the sheet, the tracks will extend diagonally clear across the film, whereas if the squeegee is a bar-type band adapted for reciprocal movement, the track will be diagonally zigzagged. For more complete randomization, such tracks of water can be applied to both sides of the sheet using an endless band squeegee having indentations on both sides with the direction of movement being reversed on the top and bottom of the film or using two reciprocating bar-type squeegees mounted on opposite sides of the sheet. With squeegees on both sides of the sheet containing indentations, three different thicknesses will be obtained in the film, the first being normal where no extra water is present, the second intermediate where one track of water is present, and the third high where two tracks of water on opposite sides of the sheet intersect. Thus, highly randomized gauge variations will result.

Although the total gauge variation in the cast and dried sheet will be increased by employing the randomization method of this invention, any gauge defects normally caused, for example, by a hopper lip irregularity producing a thick lane parallel to the machine direction will have its effect minimized. The thick lane will vary in thickness with the imposed randomized gauge variations and be subjected to the cushioning action of entrapped air between successive layers of film as it is wound, thus decreasing the severity of a gauge band normally caused by such a thick lane.

BRIEF DESCRIPTION OF THE DRAWINGS

In order that the invention may be more readily understood and carried into effect, reference is made to the accompanying drawings which are offered by way of example only and not in limitation of the invention, the scope of which is defined by the appended claims rather than by the description preceding them.

IN THE DRAWINGS

Figure 1:
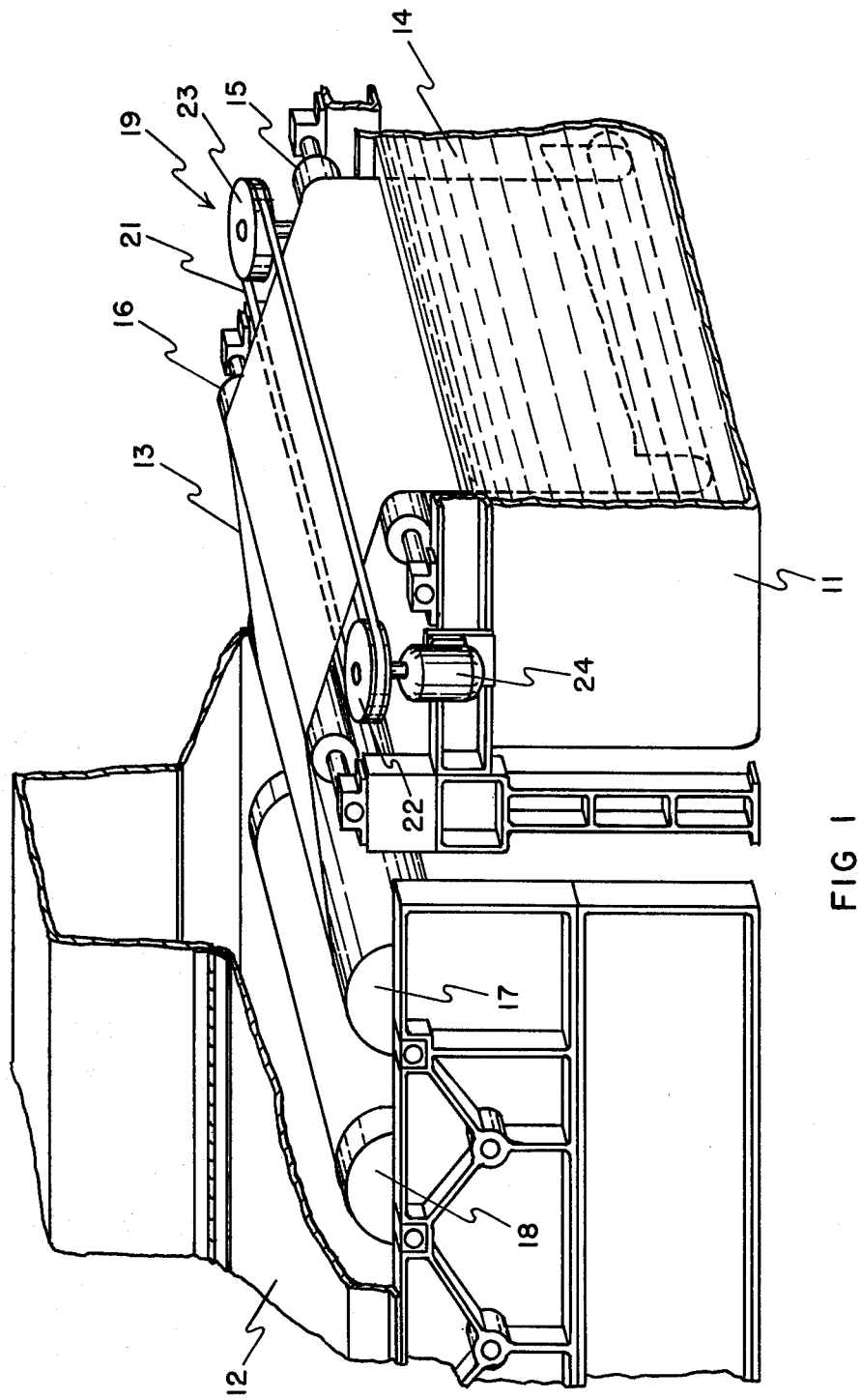

FIG. 1 is a perspective view partly in section showing apparatus used in carrying out the method of this invention.

FIG. 2 is a side view of a section of the squeegee band according to the invention.

FIG. 3 is a side view of a section of the squeegee band according to another embodiment of the invention.

FIG. 4 is a perspective view partly in section showing another embodiment of the apparatus used in accordance with the invention.

Referring now to FIG. 1, there is shown a portion of the last tank 11 and first part of the dryer 12 of a conventional regenerated cellulose film casting machine through which the cellulose film 13 passes following the previous regenerating and washing stages. Thus, film 13 is led from the aqueous bath 14 in tank 11 over idler roller 15 to idler roller 16 and thence in a serpentine fashion across dryer rollers 17 and 18 in dryer 12. Positioned between idler rollers 15 and 16 is a continuously moving squeegee, generally designated 19, comprising an endless band 21 driven around pulleys 22 and 23 by drive motor 24. One flight of squeegee band 21 contacts the top surface of film 13 and the other flight contacts the bottom surface. Normally, squeegee band 21 is used to wipe off excess water remaining on the film after it leaves tank 11. However, in accordance with the invention and as shown more clearly in FIGS. 2 and 3, a plurality of small indentations are spaced along at least one edge of band 21 which allow minute amounts of water to pass by the squeegee, thereby leaving tracks on the surface of the film. Since the squeegee band and film are both continuously moving, the tracks cross the film diagonally from one edge to the other. It will readily be understood that if both edges of band 21 have indentations as shown in the embodiment of FIG. 2, then both top and bottom surfaces of film 13 will carry diagonal tracks of water crossing one another on opposite sides of the film. On the other hand, if only one edge of squeegee band 21 has indentations as shown in the embodiment of FIG. 3, then only the surface of the film in contact with such indented edge will have tracks of water left on it. The thickness of the film in those areas having such additional amount of water is increased. This may result either because of the extra water remaining at those locations after the film passes through the dryer or because the cellulose is swollen with the extra water and does not collapse as much as adjacent locations not containing the extra moisture. In any event, the diagonal tracks form randomized gauge variations in the film which upon winding of the film into rolls minimize the effects of normal gauge bands present in the film caused by die lip imperfections, markedly improving the roll formation of the finished product.

Preferably, squeegee band 21 is constructed of stainless steel strapping of suitable dimensions to form a relatively rigid surface for the cellulose film to pass over. However, other materials constructed to possess similar properties may be employed such as bands made from other metals or synthetic polymers. The depth of the indentations in the band can vary over a relatively wide range depending upon the degree of random gauge variations desired. However, they should be small enough not to leave excessive amounts of water on the film so as to flow into adjacent tracks and obscure the pattern of resulting randomized gauge variations. The number of indentations may also vary over a relatively wide range depending upon the number of gauge variations desired in the film. Preferably, they are evenly spaced in order to maximize the benefits obtained from the randomized gauge variations in the film after it is wound into rolls.

Another device for producing randomized gauge variations is shown in FIG. 4 comprising a reciprocating squeegee band 26 having minute indentations 27 disposed in the edge over which the wet cellulose film passes after leaving the last tank on the casting machine and before entering the dryer. In this embodiment, squeegee band 26 is slidably mounted in blocks 28 and 29 and reciprocably driven by drive motor 31 through arm 32 pivotally mounted on rotor 33 and bracket 34 attached to one end of band 26. Another squeegee (not shown) contacts the opposite side of the film and may be indentically constructed. Either or both squeegees may have indentations in the edge that contacts the film, depending upon whether water tracks and randomized gauge variations are desired on only one or both surfaces of the film. From this mechanism it will readily be apparent that the water tracks left on the film are zig-zagged and produce similar patterned randomized gauge variations in the dried film.

Since the total gauge variation in the finished film will be increased by employing the randomization techniques discussed above, gauge defects normally caused by a hopper lip irregularity producing thick machine direction lanes will have their effects diminished when the film is wound into rolls. The thick lanes will vary in thickness with the imposed randomized gauge variations and thus be subject to the cushioning action of entrapped air which decreases the severity of the gauge bands normally resulting from the thick lanes.

From the foregoing it is apparent that the present invention provides a highly useful technique for improving roll formation in regenerated cellulose film. However, the preceding description and examples are only illustrative of the invention and it is to be understood that many variations may be resorted to without departing from the spirit and scope of the invention, as those skilled in the art will readily understand.

What is claimed is:

1. In the method for producing regenerated cellulose film on a casting machine in which viscose is extruded through a dye and cast in a coagulating and regenerating bath, subsequently passed through a series of baths for desulfuring, washing, bleaching, and softening and then passed through a dryer and dried after which it is wound into rolls, the improvement comprising improving the roll formation of the finished film by selectively varying the water content in discrete areas across the film between the last bath on the casting machine and before the film is passed to the dryer whereby randomized gauge variations are introduced in the finished film.

2. The method of claim 1 in which the water content is varied by laying down a plurality of minute diagonal tracks of water on at least one surface of the film immediately prior to passing the film to the dryer.

3. The method of claim 2 in which the tracks of water cross the film diagonally from one edge to the other.

4. The method of claim 2 in which the tracks of water are diagonally zig-zagged on the film surface.

5. The method of claim 2 in which the tracks of water are laid down on both surfaces of the film.

6. The method of claim 2 in which the diagonal tracks of water are applied to the surface of the film by a continuously moving squeegee having a plurality of spaced indentations on its surface in contact with the film as the film leaves the final bath on the casting machine prior to entering the dryer.

* * * * *